United States Patent

[11] 3,548,890

[72] Inventor Hermann Josef Langen
 Cuyk, Netherlands
[21] Appl. No. 624,928
[22] Filed Mar. 21, 1967
[45] Patented Dec. 22, 1970
[73] Assignee H. J. Langen & Sons Canada Ltd.
 Weston, Ontario, Canada
 a company
[32] Priority Mar. 21, 1967
[33] Netherlands
[31] No. 6603697

[54] MEAT PRESSING MACHINE AND PROCESS
 4 Claims, 3 Drawing Figs.
[52] U.S. Cl. ............................................. 141/7,
 141/8, 141/12, 141/283; 99/174; 53/124
[51] Int. Cl. .................................................. B65b 1/04,
 B65b 3/04
[50] Field of Search........................................ 141/7, 8,
 12, 48, 50, 51, 59, 60, 61, 71, 72, 73, 74, 75, 76,
 77, 78, 79, 80, 81, 249, 258, 259, 260, 261, 262,
 263, 264, 282, 283, 292; 53/(Inquired), 187, 124;
 100/(Inquired); 99/(Inquired), 187, 174

[56] References Cited
UNITED STATES PATENTS
3,185,188 5/1965 Brander et al. ................ 141/12
3,371,690 3/1968 Hawley........................ 141/283X
3,373,777 3/1968 Hawley........................ 141/283X Primary Examiner— Houston S. Bell
Attorney—Maybee & Legris ABSTRACT: This invention relates to a process and a machine for pressing meat into a can under vacuum conditions. The meat is placed in a pressing chamber having a side opening connected with an external guide tube, on the end of which the can is placed. A vacuum chamber is moved into engagement with the pressing chamber, with which it communicates via the guide tube, and is evacuated. A support member carried by the vacuum chamber, and controlled by a piston-cylinder combination, engages the bottom of the can when the vacuum chamber is moved into engagement with the pressing chamber. Initially the meat is prepressed within the pressing chamber, and then a pressing force is applied to the meat to compress the meat into the guide tube against the bottom of the can, the support member holding the can in place to resist the pressing force. The resistance of the piston-cylinder combination supporting the support member is next reduced and a second pressing force is applied to the meat, the can being displaced from the guide tube by the second pressing force and the meat being extruded into the can. The piston of the cylinder combination is connected to the vacuum chamber by a changeover valve, which admits vacuum to the cylinder during the prepressing and first pressing operations, but which vents the cylinder to atmosphere during the final pressing operation, thus reducing the opposing force exerted by the support member. The various pressing operations on the meat are controlled in a timed sequence by a system of pneumatic valves, which system includes the changeover valve connecting the cylinder of the piston cylinder combination to the vacuum chamber.

PATENTED DEC22 1970

3,548,890

INVENTOR
HERMANN J. LANGEN
BY Maybee & Legris
ATTORNEYS

MEAT PRESSING MACHINE AND PROCESS

BACKGROUND OF THE INVENTION

This invention relates to a process for pressing meat, such as ham, into a can, in which process the meat and the can are situated in an evacuated space, that is to say a space at subatmospheric pressure, during the pressing operation. The invention also relates to a machine for carrying out the process.

In one known process of this type, vacuum is applied both before and during the pressing operation in order to prevent air from remaining between the can and the meat during pressing.

SUMMARY OF THE INVENTION

According to the present invention the applied vacuum is utilized in such a way that the force supporting the meat and/or the can during the pressing operation, and counterbalancing the pressing force, is controlled by the vacuum, the force being obtained by the joint action of the applied vacuum with one or more support surfaces. The meat and the can are mounted in an evacuated chamber, i.e. a chamber at subatmospheric pressure, including a guide tube; the meat is compressed into the guide tube against the bottom of the can, the can being supported by a support member to which an opposing force greater than the pressing force is applied, and the meat is subsequently pressed into the can, the opposing force being reduced to permit displacement of the support member and hence removal of the can from the guide tube.

In a preferred process according to the invention the meat is placed in a pressing chamber, which is closed by a lid, the meat being subsequently pre-pressed inside the chamber and then pressed through the guide tube into the can, which is placed over one end of the guide tube and supported by a support member or pressure plate. After the lid is closed vacuum is applied to the chamber and to a pneumatic motor connected to the support member, the pneumatic motor communicating with the chamber. The applied vacuum is such that during the prepressing operation and during the subsequent pressing of the meat into the guide tube, the pressing forces transmitted to the lid and to the can, respectively, are less than the force exerted by the vacuum on the lid and by the pneumatic motor on the support member.

The invention makes it possible to automate a number of operations hitherto performed manually, such as securing the lid of the pressing chamber, and positioning and holding the support member. The invention also makes it possible to can the meat under carefully controlled conditions; this is done by pressing the meat against the bottom of the can while reducing the opposing force exerted by the support member, so that the latter is displaced and the meat is transferred to the can as the can slides off the guide tube.

BRIEF DESCRIPTION OF THE DRAWINGS

One process in accordance with the invention, and a machine for carrying out the process, will now be described by way of example with reference to the accompanying drawings, in which.

DESCRIPTION OF THE PREFERRED EMBODIMENT

Figure 1:
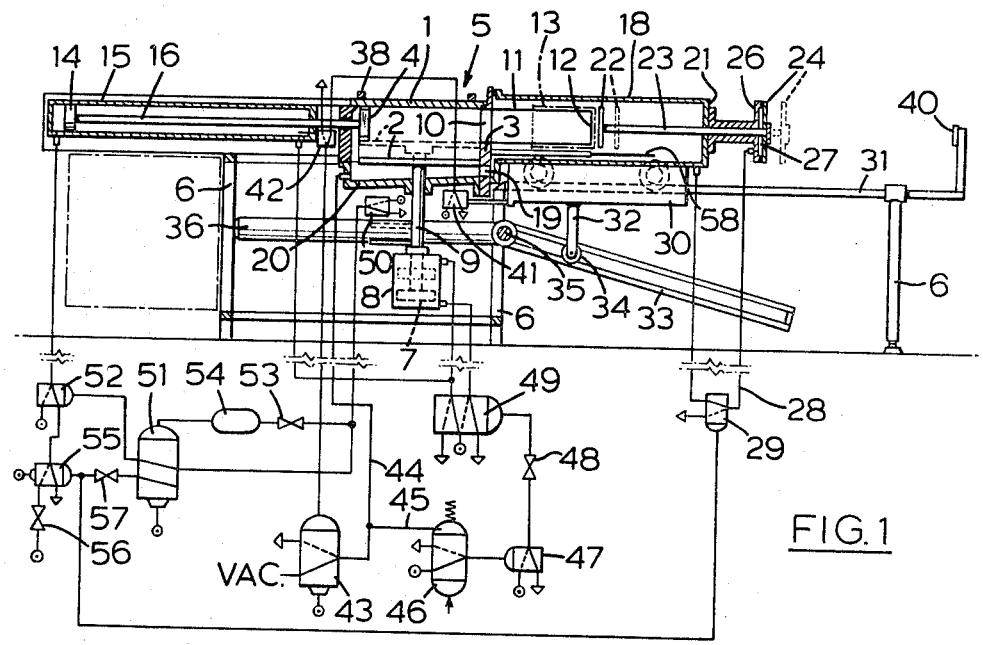
FIG. 1 is a longitudinal section through the machine, the figure including a diagrammatic representation of a pneumatic control circuit for the machine.

Referring to the drawings, the machine includes a pressing chamber 5 having walls 1, 2, 3 and 4. The pressing chamber 5 is supported by a support frame 6 of the machine. The wall 1 is situated at the top side of the pressing chamber and serves as a lid which when in its closed position hermetically seals the pressing chamber. The wall 2, which is situated opposite the lid 1, is constructed as a pressure plate and can be moved from a lower position (indicated in full lines in FIG. 1) to an upper position (indicated in dotted lines), the movement being effected by a piston rod 9 connected to a pneumatic motor comprising a piston 7 sliding in a cylinder 8. The vertical wall 4 serves as a stop and limits the upward movement of the pressure plate 2. The wall 3 has an opening 10 to which is fitted a metal guide tube 11 of the same inner section as the opening. A meat can 13 can be pushed onto the open end 12 of the guide tube. The wall 4 opposite the wall 3 of the pressing chamber 5 is constructed as a pressure plate, which can be moved from one end position to the other by means of a piston rod 16 connected with a pneumatic motor comprising a piston 14 sliding in a cylinder cylinder 15. The end of a vacuum chamber 18, open on its left-hand end, bears against the outer surface of the wall 3, and a rubber sealing ring 17 provides a seal between the end of the vacuum chamber and the wall. The vacuum chamber, which when in the position shown in FIG. 1 closes the pressing chamber 5, communicates with the space above the pressure plate 2 via the opening 10, and communicates with the space below the pressure plate 2 via an opening 19. The piston rod 9 extends through a vacuum-tight seal in a base wall 20 closing the bottom of the chamber 5. A round-sectioned bar 23, bearing a supporting pressure plate 22 inside the vacuum chamber 18, protrudes through the closed end wall 21 of the vacuum chamber. The bar 23 is connected at its end to a piston 24 protruding outside the vacuum chamber 18. The piston 24 can, by means of a sealing ring 25, rest against the flange 26 firmly connected with the vacuum chamber 18, so that a vacuum space 27 is created between the piston 24 and the flange 26, which space can be optionally connected with the vacuum chamber or with atmosphere by an air line 28 and a pneumatically regulated air valve 29. The piston 24, sealing ring 25, and flange 26 constitute a pneumatic motor which may be actuated by the vacuum in the vacuum chamber to control a force applied to the support member or supporting pressure plate 22.

FIG. 1 shows the supporting pressure plate 22 in full lines in a position in which it supports the bottom of a can 13 against the open end 12 of the guide tube. The surface of the piston 24 is such that, with vacuum applied to the piston 24, the force exerted by the support member 22 is greater than the pressing force exerted on the support member 22 by the pneumatic motor 14,15. So long as vacuum is maintained in the space 27, the support member 22 remains in its supporting position. The alternative position of the support member is illustrated in FIG. 1 by dotted lines. In this other position of the support member 22, the space 27 is no longer closed and so, if there is still vacuum present in the vacuum chamber 18, this will only be effective over an area as large as the section of the bar 23. The supporting force exerted on the support member 22 to the left, that is to say the opposing force, is in this case smaller than the pressing force exerted by the pneumatic motor 14,15, and so the support member is pressed towards the right. In this way the meat at the open end 12 of the guide tube 11 is pushed into the can 13, so that starting at the bottom of the can it is fed into the can and fitted well to the wall of the can.

Figure 2:
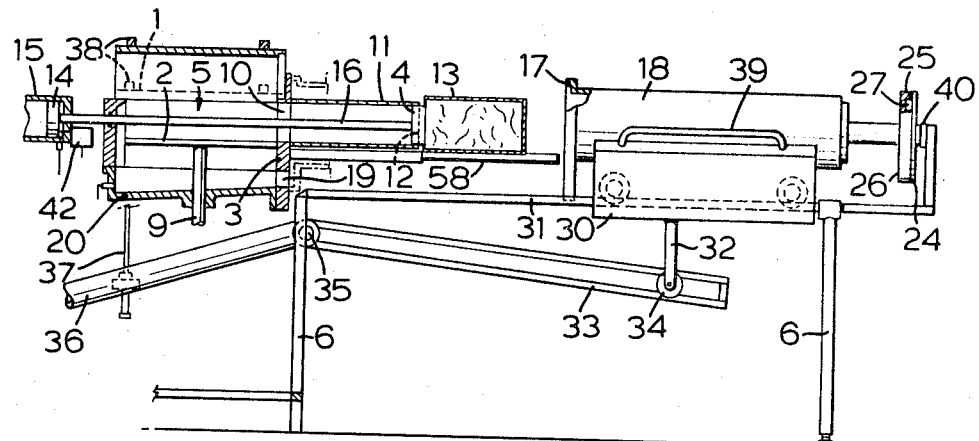
FIG. 2 shows a detail of the machine when in a second operative position.
Figure 3:
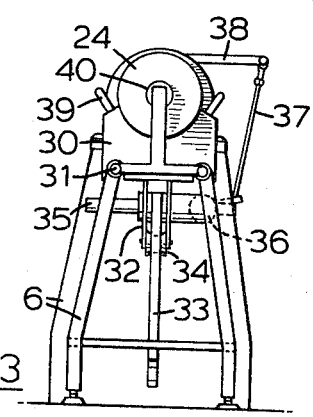
FIG. 3 is an end view of the machine.

The vacuum chamber 18 has two guide slide plates 30, which cooperate with a guide 31 (see FIG. 3). On the lower side of the vacuum chamber 18 an arm 32 is mounted, which carries on its end a roller 34 running along a guide way 33. The guide way 33 is hinged on a hinge joint 35 mounted securely to the support frame 6, and is provided on the other side of the hinge joint 35 with a counterweight 36. The force exerted on the vacuum chamber by this counterweight via the roller 34 and arm 32, is such that the vacuum chamber moves to the position shown in FIG. 2 when it is released by removing the vacuum from the vacuum chamber. A rod 37 is connected with the counterweight, which rod can open and close the pressing chamber lid 1 by means of a hinged arm 38.

The counterweight 36 will, when in a condition of rest, keep the pressing chamber lid 1 in its open position and also keep the vacuum chamber 18 in the position shown in FIG. 2, so that access is provided to the guide tube 11 and the pressing chamber 5. The facing slide plate 30 of the vacuum chamber 18 has a hand grip 39. The vacuum chamber 18 can now be moved along the guide 31 by hand, using the hand grip 39, during which movement a lifting action is exercised on the counterweight 36 by the combination of arm 32, roller 34, guide way 33 and the hinge joint 35. At the same time the lid 1 is closed by means of the rod 37 and arm 38. If then there is no vacuum created in the vacuum chamber 18, the counterweight 36 will prevent the closing action described above. If, however, immediately after the vacuum chamber 18 is closed against the pressing chamber wall 3 and the lid 1 is closed, a sufficiently strong vacuum is created in the pressing chamber 5 and the vacuum chamber 18, the lid 1 and the vacuum chamber 18 will be drawn onto the pressing chamber against the wall 3 with a force which cannot be overcome by the action of the counterweight 36. The surface of the lid 1 is so dimensioned that an upward force exercised by the pressure plate 2 on a piece of meat placed in the pressing chamber 5 is smaller than the force exerted by the vacuum on the lid 1. The creation of a vacuum in the pressing chamber 5 avoids the need for special means for locking the pressing chamber lid 1.

On the support frame 6 of the machine an end stop 40 is also mounted, against which stop the piston 24 can strike, as illustrated in FIG. 2. Owing to the action of the counterweight 36, the vacuum chamber will finally press the flange 26 against the piston 24, reestablishing the closed space 27.

The operation of the machine will now be described with particular reference to the pneumatic control circuit, which is illustrated diagrammatically in FIG. 1.

The description will start from the position in which the vacuum chamber 18 has just been closed, as indicated in FIG. 1. When the vacuum chamber 18 and the lid 1 are closed, the slide plate 30 engages a stop which actuates a changeover valve 41. This valve is switched over from its air venting position, shown in full lines, to its control position, at which it passes a pneumatic signal to the regulating input of a regulating valve 43, via a switch valve 42. Consequently the regulating valve 43 is changed over and creates a vacuum in the pressing chamber 5, to which it is connected by a pipe line 44, and in the vacuum chamber 18. This vacuum is supplied via the pipe line 28 and the regulating valve 29 to the space 27 between the flange 26 and the piston 24. The pressing chamber lid 1 is drawn into sealing engagement with the pressing chamber 5, and the vacuum chamber 18 is drawn tightly onto the wall 3 of the pressing chamber. The piston 24 is sealed by the sealing ring 25 on the flange 26 and creates the vacuum space 27. The creation of the vacuum causes a signal to be passed to a regulating valve 46 via a measuring pipe line 45, the valve 46 being mechanically preenergized; an air-venting signal is thereupon passed to a regulating valve 47, which operates to pass a control signal to a switching valve 49 via a throttle valve 48.

The switching valve 39 when in its initial position shown in the drawing, ensures that pneumatic pressure is applied to the top side of piston 7 of the pneumatic motor 7,8. When the switching valve 49 is switched over, compressed air is admitted to the underside of the piston 7, so that the piston rises within the cylinder 8 and presses upwardly the pressing chamber 2 serving as a pressure plate, via the piston rod 9. In this way a piece of meat placed in the pressing chamber 5 will be prepressed against the pressing chamber lid 1, which is held closed by the vacuum created in the chamber 5.

When the pressure plate 2 reaches its limiting top position determined by the wall 4, a pneumatic limit switch 50 is operated by the piston rod 9. This causes an air signal to be supplied through a switch transmission of a regulating valve 51 to the regulating input of a regulating valve 52, and via a throttle valve 53 and an accumulator 54 to the regulating input of the regulating valve 51. The immediate supply of a control signal to the valve 52 causes the latter to pass compressed air to the left-hand side of the piston 14, which in its turn actuates the pressure plate 4 and presses the meat.

The meat is prepressed between the pressing chamber lid 1 and the pressure plate 2, through the opening 10 in the wall 3, and into the guide tube 11 and against the bottom of the can 13 which is placed over the open end 12 of the guide tube. As previously stated, under these circumstances the vacuum prevailing in the space 27 exerts a supporting force on the support member 22 which force opposes and exceeds the pressing force of the piston 14. The meat is therefore compressed against the bottom of the can 13 inside the tube 11. Thereupon the signal supplied to the regulating input of the valve 52 also reaches the regulating input of the valve 51 with some delay as a result of the throttle valve 53 and the accumulator 54. Consequently the regulating valve 52, under the action of the valve 55 and throttle valve 56, returns to its air venting position shown in full lines, and the pressing force exerted on the piston 14 is removed. Thus, the pressing force exerted by the piston rod 16, the pressure plate 4, the meat and the bottom of the can is e removed from the pressure plate or support member 22.

During the delayed switching over of the regulating valve 51, a signal is supplied to the regulating input of the valve 55 and to the input of regulating valve 29 which connects the space 27 with the vacuum chamber 18. The space 27 is evacuated and, upon changeover of valve 52, the regulating valve 55 is actuated to admit compressed air into the cylinder 15 at the left-hand side of the piston 14. The pressure plate 4, driven by the piston rod 16, thereupon again presses the meat against the bottom of the can, but the supporting pressure plate 22 now offers a much lower resistance, or opposing force, which is determined by the section of the bar 23 and the still prevailing vacuum in the vacuum chamber 18. The meat and the can are first towards the right, and at the same time the meat is pressed into the can starting at the bottom. Finally the piston 14 operates the pneumatic switch 42, which in its turn supplies a signal to the vacuum valve 43 whereby the pressing chamber 5 and the vacuum chamber 18 are filled with air. As soon as the vacuum in the vacuum chamber 18 is removed, the counterweight 36 and the spring (not shown) in the valve 41 cause a removal of the vacuum chamber 18 to the right, and the pressing chamber lid 1 is opened. The meat pressed into the can now lies on a table 58 on an extension of the guide tube 11, and the vacuum chamber 18 is driven against the stop with the flange 26 against the piston 24.

The removal of the vacuum in the measuring pipeline 45 puts tne spring valve 46 back into its starting position (as shown), whereby the two pistons 7 and 14 inside the cylinders 8 and 15 are put back into their starting position via the valve 47 and the valve 48. Also the valve is switched over so that the space 27 is again connected with the interior of the vacuum chamber 18 via the air line 28 and valve 29. The starting position with the pressing chamber lid open, is then reached.

The machine can be operated in such a way that a workman responsible for weighing the meat can place the meat directly into the open pressing chamber. At the same time another workman can take away the filled can, push a new can over the open end 12 of the guide tube 11, and also push the vacuum chamber 18 against the outside of the chamber wall 3 by means of the hand grip 39, whereupon the counterweight 36 will automatically close the pressing chamber lid 1. The machine is then ready to start a new operating cycle automatically. The machine may be operated by a single workman, who also weighs the meat, if he is correctly positioned with respect to the machine.

I claim:

1. A machine for pressing meat into a can, comprising a pressing chamber having a number of walls including a first wall serving as a lid to the pressing chamber, a second wall serving as a pressure plate which is movable for prepressing the meat against the opposite wall, a third wall having an opening to which an external guide tube is fitted for guiding the prepressed meat from the chamber, and a fourth wall opposite to the third wall serving as a pressure plate which is movable towards the guide tube for pressing the prepressed meat through the opening into the guide tube, first and second pneumatic motors for moving said second and fourth walls for exerting pressing forces on the meat, a vacuum chamber having an open end, the vacuum chamber being movable along guide means between a first position in which its open end engages the third wall of the pressing chamber to close the pressing chamber and a second position in which it is disengaged from said third wall, a support member within the vacuum chamber, the support member being carried by a longitudinally slidable bar aligned with the guide tube, the support member being positioned to engage a can placed upon the guide tube, a third pneumatic motor coupled to the bar for exerting a force upon the support member, control means for evacuating the vacuum chamber, and value means connecting the third pneumatic motor to the vacuum chamber.

2. A machine for pressing meat into a can, comprising a pressing chamber having a number of walls including a first wall serving as a lid to the pressing chamber, a second wall serving as a pressure plate which is movable for prepressing the meat against the opposite wall, a third wall having an opening to which an external guide tube is fitted for guiding the prepressed meat from the chamber, and a fourth wall opposite to the third wall serving as a pressure plate which is movable towards the guide tube for pressing the prepressed meat through the opening into the guide tube, first and second pneumatic motors for moving said second and fourth walls for exerting pressing forces on the meat, a vacuum chamber having an open end, the vacuum chamber being movable along the guide means between a first position in which its open end engages the third wall of the pressing chamber to close the pressing chamber and a second position in which it is disengaged from the third wall and removed from the guide tube, a support member within the vacuum chamber, the support member being carried by a longitudinally slidable bar aligned with the guide tube, the support member being positioned to engage a can placed upon the guide tube, a pneumatic means coupled to the bar for exerting a force on the support member opposing the pressing force exerted by the fourth wall, means for evacuating the vacuum chamber and pressing chamber, valve means for operating the pneumatic motors and said pneumatic means in timed sequence for performing the operations of prepressing the meat, pressing the meat into the guide tube, and pressing the meat through the guide tube into the can, the valve means including a regulating valve connected between the pneumatic means and the vacuum chamber, which valve has a first position, operative during the first and second meat-pressing operations, in which first position the pneumatic means is connected to the vacuum of the vacuum chamber, and a second position, operative during the third meat-pressing operation, in which second position the pneumatic means is vented to atmosphere.

3. A process for packing meat into a can under pressure, the can being closed at one end, comprising:
   a. providing an evacuated chamber including a guide tube;
   b. positioning the can over one end of the tube, said one end of the tube being within the can and adjacent to said closed end;
   c. positioning a support member external to the can to bear against said closed end;
   d. applying a pressing force to the meat to force the meat along the tube against the bottom of the can while simultaneously applying an opposing force to the support member of sufficient magnitude to resist the applied pressing force; and
   e. subsequently reducing the magnitude of the opposing force to permit displacement of the support member and removal of the can from the tube.

4. In a process according to claim 3, the step of prepressing the meat within the chamber prior to the application of said pressing force.